United States Patent
Buzon

(10) Patent No.: US 8,256,175 B2
(45) Date of Patent: Sep. 4, 2012

(54) STUD

(75) Inventor: Claude Buzon, Herstal (BE)

(73) Assignee: Buzon Pedestal International S.A., Herstal (BE)

(*) Notice: Subject to any disclaimer, the term of this patent is extended or adjusted under 35 U.S.C. 154(b) by 474 days.

(21) Appl. No.: 12/289,100

(22) Filed: Oct. 20, 2008

(65) Prior Publication Data

US 2009/0173018 A1    Jul. 9, 2009

(30) Foreign Application Priority Data

Oct. 22, 2007 (EP) .................................. 07119027

(51) Int. Cl.
*E04B 5/43* (2006.01)
*E04B 5/48* (2006.01)

(52) U.S. Cl. ....... 52/263; 52/126.6; 52/126.4; 52/126.3; 248/188.4; 248/354.3

(58) Field of Classification Search ............... 52/263, 52/126.3, 126.4, 126.6, 126.1, 126.7, 126.5; 248/354.1, 354.3, 188.4
See application file for complete search history.

(56) References Cited

U.S. PATENT DOCUMENTS

| | | | | |
|---|---|---|---|---|
| 1,646,725 A | * | 10/1927 | Davidson ..................... 52/690 |
| 2,451,777 A | * | 10/1948 | Salas .......................... 425/123 |
| 2,617,620 A | * | 11/1952 | Jessop ......................... 254/98 |
| 2,940,784 A | * | 6/1960 | Fell ............................. 74/89.35 |
| 3,199,257 A | * | 8/1965 | Spiselman et al. ......... 52/263 |
| 3,308,587 A | * | 3/1967 | Gilroy et al. ............... 52/126.5 |
| 3,318,057 A | * | 5/1967 | Norsworthy ............... 52/126.6 |
| 3,324,614 A | * | 6/1967 | Loewenau .................. 52/126.6 |
| 3,736,010 A | * | 5/1973 | Larkin ........................ 403/104 |
| 3,870,268 A | * | 3/1975 | Larkin ........................ 248/354.1 |
| 3,888,064 A | | 6/1975 | Basile |
| 4,685,258 A | * | 8/1987 | Av-Zuk ...................... 52/126.6 |
| 5,116,004 A | * | 5/1992 | Luecke ....................... 248/161 |
| 5,511,760 A | * | 4/1996 | Kambara .................... 248/650 |
| 5,588,264 A | * | 12/1996 | Buzon ........................ 52/126.6 |
| 5,862,635 A | * | 1/1999 | Linse et al. ................ 52/126.6 |
| 6,059,258 A | * | 5/2000 | Jackson ...................... 249/18 |
| 6,256,939 B1 | * | 7/2001 | Snyder ....................... 52/126.6 |
| 6,520,461 B1 | * | 2/2003 | Graham ..................... 248/188.8 |

(Continued)

FOREIGN PATENT DOCUMENTS

FR     1303271     9/1962
GB     985148      3/1965

*Primary Examiner* — Phi Dieu Tran A
(74) *Attorney, Agent, or Firm* — Jacobson Holman PLLC

(57) ABSTRACT

A stud for enabling a construction surface to be raised with respect to the ground, said stud comprising at least a first and second element, said first element comprising a first body mounted on a base intended to be placed on said ground, said second element comprising a second body, each of the bodies being provided with a screw thread for mutually engaging one in the other, thus forming an internal body and an external body, said external body being provided with an orifice giving access to the screw thread of the internal body, said stud also comprising a locking member arranged to lock the movement of the first body with respect to the second body in a plurality of positions, the locking member comprising first and second segments, said first segment being designed to pass through said orifice and be inserted between two successive grooves of the screw thread on the internal body, said second segment being designed to pass through said orifice and be interposed in a space provided in an internal wall of the external body.

10 Claims, 3 Drawing Sheets

U.S. PATENT DOCUMENTS

Figure 1:
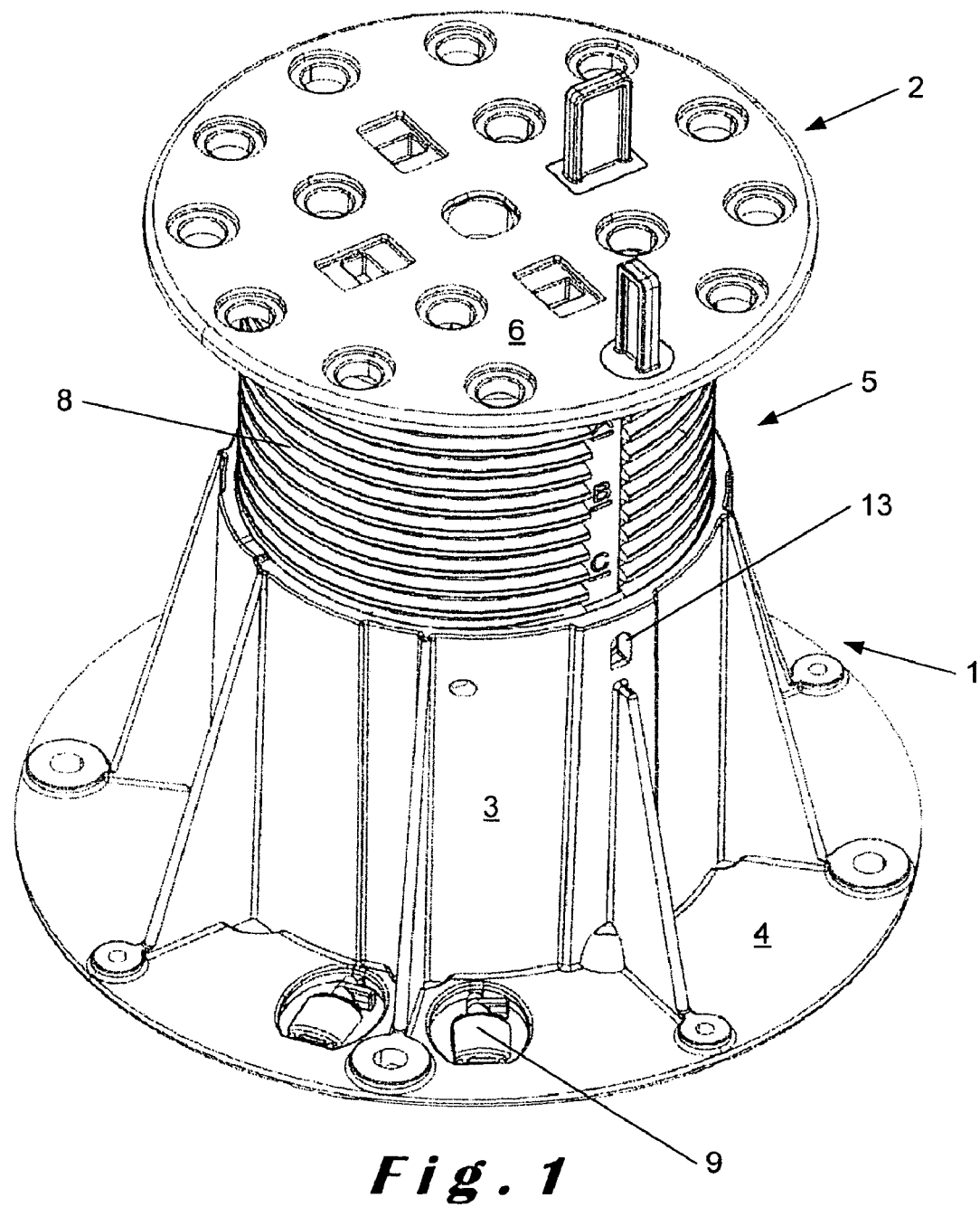

| | | | |
|---|---|---|---|
| 6,631,878 B1 * | 10/2003 | Adam | 248/188.4 |
| 6,820,379 B1 * | 11/2004 | Krinner et al. | 52/157 |
| 7,052,334 B1 * | 5/2006 | Cabay et al. | 439/803 |
| 7,516,579 B2 * | 4/2009 | Kreyenborg et al. | 52/126.1 |
| 7,587,872 B2 * | 9/2009 | Kodi | 52/649.1 |
| 7,708,510 B2 * | 5/2010 | Reimler | 411/166 |
| 2004/0035064 A1 * | 2/2004 | Kugler et al. | 52/126.6 |

* cited by examiner

STUD

The present invention relates to a stud for enabling a construction surface to be raised with respect to the ground, said stud comprising at least a first and second element, said first element comprising a first body mounted on a base intended to be placed on said ground, said second element comprising a second body, each of the bodies being provided with a screw thread for mutually engaging one in the other, thus forming an internal body and an external body.

Such studs are known from the American patent application U.S. Pat. No. 5,588,264. The studs described in this patent application comprise two elements each provided with a screw thread for mutually engaging one in the other. The elements form a support for a construction surface. By making one element turn with respect to the other element, the height of the stud is adjustable, which makes it possible to compensate for the difference in height between the construction surface and the ground.

One problem with the known studs is that, after adjustment of the height, the elements may still move with respect to each other, thus falsifying the adjustment. The elements may for example move and lose their adjustment because of vibration incurred during transportation thereof. This has the consequence that the actual height is no longer equal to the height at which the stud was adjusted.

The object of the present invention is to produce a stud that makes it possible, after adjustment, to prevent movement of one element with respect to the other, and this in a simple and reliable fashion.

To this end, a stud according to the invention is characterized in that, said external body being provided with an orifice giving access to the screw thread of the internal body, said stud also comprising a locking member arranged to lock the movement of the first body with respect to the second body in a plurality of positions, the locking member comprising first and second segments, said first segment being designed to pass through said orifice and be inserted between two successive grooves of the screw thread on the internal body, said second segment being designed to pass through said orifice and be interposed in a space provided in an internal wall of the external body. Use of the locking member makes it possible to remedy the fact that the elements move with respect to each other. This is because, owing to the fact that the first segment is inserted between two successive grooves and passes through the orifice, the two elements are locked with respect to each other. Thus the alignment in height is lo maintained. The locking member thus affords maintenance of the adjusted height in a simple and reliable fashion.

Preferably, said space comprises a surface, the thickness of which increases, said second segment being arranged to engage by rotation on this surface after the locking member has been introduced into the orifice. The advantage of this surface is that, in combination with the rotation of the locking member, it helps to convert this rotation into an axial movement of the first segment. Thus the second segment will be pushed in the direction of the internal body and will drive the first segment between two successive grooves of the screw thread.

Figure 2:
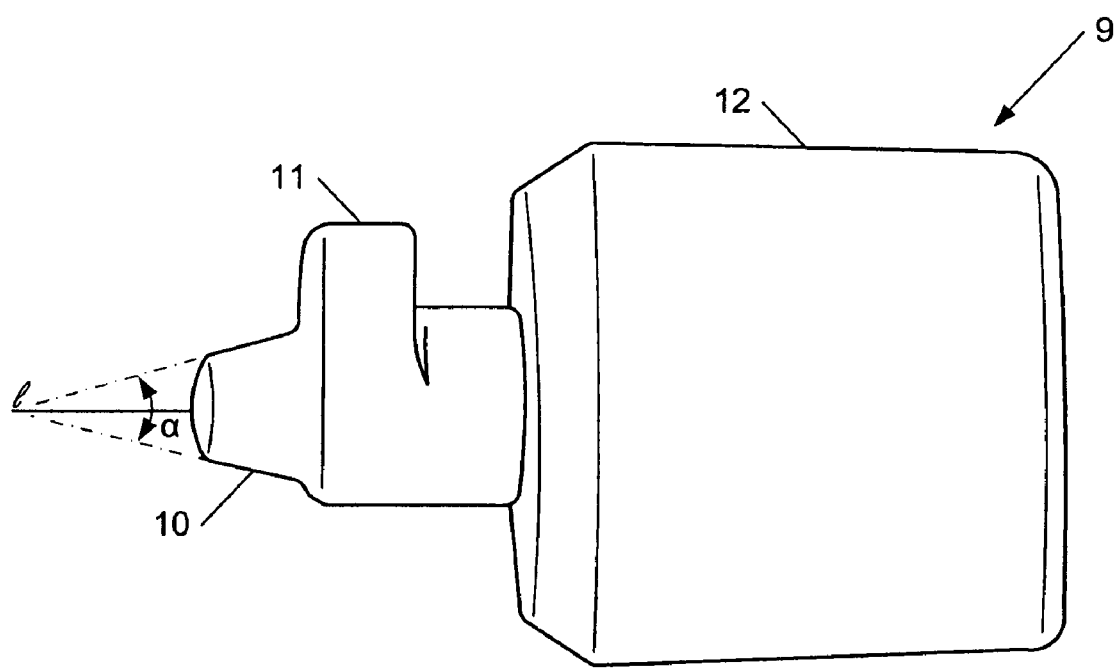
Figure 3A:
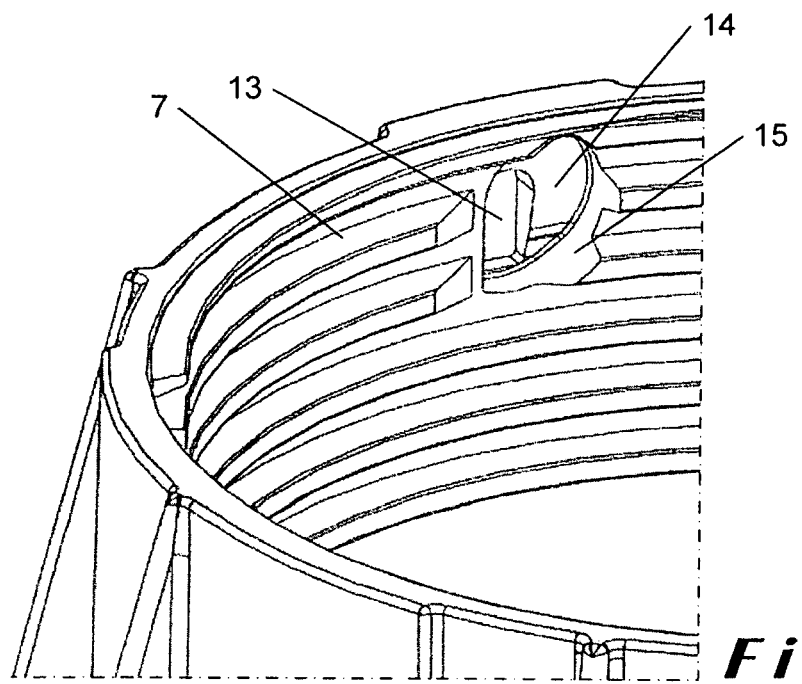
Figure 3B:
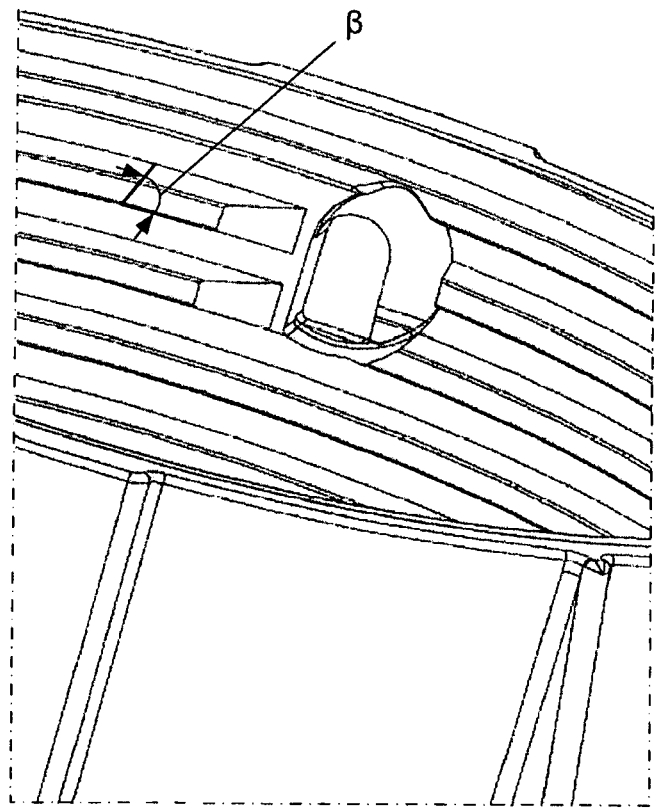

The invention will now be described in more detail with the help of the drawings illustrating a preferential embodiment of the stud according to the invention. In the drawings:

FIG. 1 illustrates a stud according to the invention;
FIG. 2 illustrates the locking member; and
FIG. 3 illustrates a detail of the internal face of the external body situated level with the orifice.

In the same drawings the same reference has been allocated to the same element or to a similar element.

FIG. 1 illustrates an embodiment of a stud according to the invention. This stud comprises a first element 1 and a second element 2. The first element 1 comprises a first body 3 mounted on a base 4 intended to be placed on the ground. The second element 2 comprises a second body 5 provided at its top part with a surface 6. This surface 6 serves as a support for pavement elements such as for example slabs or the like. The first body 3 is provided with a screw thread 7 applied inside the body 3. The second body 5 is provided with a screw thread 8 applied outside the body 5. The two screw threads 7 and 8 are formed so as to be able to mutually engage one in the other, so as to move the first and second bodies with respect to themselves. Thus the second body 5 forms an internal body 5 and the first body 3 forms an external body 3 of the stud.

The invention is however in no way limited to a stud comprising two elements and also applies to studs comprising intermediate elements provided with a screw thread. Obviously it is possible to provide the first body 3 with a screw thread applied to the outside and second body 5 with a screw thread applied to the inside.

The stud also comprises a locking member 9. As illustrated in FIG. 2, the locking member comprises a first segment 10, a second segment 11 and an engagement segment 12. In the example embodiment the first segment 10 forms one end of the locking member while the engagement segment 12 forms the other end. The second segment being situated between the first segment and the engagement segment and extends perpendicular to the axis I of the locking member. The first segment 10 is designed to be inserted between two successive grooves of the screw thread 8 on the internal body 5. The second segment 11 is designed to be interposed in a space provided in an internal wall of the external body 3 as will be described in more detail below. In this embodiment, the engagement segment 12 is formed by a handle. It is also possible for the engagement segment 12 to be formed by a female element of a hexagonal member, or any other elements enabling the locking member to be manipulated.

The locking member 9 can be housed in the base 4, as illustrated in FIG. 1, so that the locking member 9 can be dislodged therein before use. This facilitates the manufacture for molding of a stud according to the invention.

The external body 3 also comprises an orifice 13 situated in the wall of this body and passing through the latter. The orifice 13 gives access to the screw thread 8 of the internal body 5. The orifice 13 is oriented in the direction of the height of the stud and perpendicular to the screw thread 7 and 8. As illustrated in FIG. 3, level with the orifice, the screw thread is interrupted in order thus to create a space 15 provided in an internal wall of the external body. This space comprises a surface 14. The thickness of this surface 14 increases from the bottom towards the top. The surface 14 thus enables the second segment to engage therein, after the locking member 9 has been introduced into the orifice.

In order to introduce the locking member 9 into the orifice 13, the locking member must be oriented so that the first segment 10 points in the direction of the body 3, and the second segment is oriented towards the base 4. By dint of entering the orifice, the first segment 10 will come to slide between two successive grooves of the screw thread 8. When the first and second segments have passed through the orifice 13, the locking member 9 is driven in rotation by a user. Through this rotation, the second segment will come into contact with the surface 14. Since this surface increases, the second segment will be pushed in the direction of the internal body and will make the first segment slide more between two successive grooves of the screw thread.

When it is situated between the grooves of the screw thread, the first segment 10 points in a direction perpendicular with respect to the direction of this screw thread 8. The locking member 9, after having being gripped against a surface 14, remains fixed to the latter. When the locking member 9 is in the locking position, there is therefore friction between the first segment 10 and two successive grooves of the screw thread 8.

The screw thread 8 of the internal body 5 has a trapezoidal thread with a vertex angle α, and the first segment 10 has the shape of a truncated cone with a vertex angle β. In order to cause optimum friction, the vertex angle α is preferably substantially equal to the vertex angle β. Through this friction, the locking member 9 locks the movement of the internal body 5 with respect to the external body 3. In this way, the locking member 9 make it possible to lock the movement of a first element 1 with respect to a second 2 adequately.

The invention claimed is:

1. A stud for enabling a construction surface to be raised with respect to the ground, said stud comprising at least a first and second element, said first element comprising a first body mounted on a base intended to be placed on said ground, said second element comprising a second body, each of the bodies being provided with a screw thread for mutually engaging one in the other, thus forming an internal body and an external body, characterized in that, said external body being provided with an orifice giving access to the screw thread of the internal body, said stud also comprising a locking member arranged to lock the movement of the first body with respect to the second body in a plurality of positions, the locking member comprising first and second segments, said first segment being designed to pass through said orifice and be inserted between two successive grooves of the screw thread on the internal body, said second segment being designed to pass through said orifice and be interposed in a space provided in an internal wall of the external body, said screw thread on said internal wall of said first body being interrupted in order to form said space within said internal wall, which space comprises a surface applied on said internal wall in such a manner that a thickness of the internal wall within said space increases, said second segment being arranged to engage by rotation on this surface after the locking member has been introduced into the orifice.

2. The stud according to claim 1, characterized in that said screw thread on the internal body has a trapezoidal thread with an vertex angle β, said first segment having the form of a truncated cone with a vertex angle β, said vertex angle β being substantially equal to the vertex angle β, said screw thread and said first segment being formed so that said first segment is inserted in said screw thread thus causing friction between them.

3. The stud according to claim 1, characterized in that said orifice is oriented in the direction of the height and perpendicular to the screw thread.

4. The stud according to claim 1, characterized in that the locking member is housed in said base so that the locking member can be dislodged therein before use.

5. The stud according to claim 1, characterized in that said space has a non-threaded surface.

6. A stud for enabling a construction surface to be raised with respect to the ground, said stud comprising at least a first and second element, said first element comprising a first body mounted on a base intended to be placed on said ground, said second element comprising a second body, each of the bodies being provided with a screw thread for mutually engaging one in the other, thus forming an internal body and an external body, characterized in that, said external body being provided with an orifice giving access to the screw thread of the internal body, said stud also comprising a locking member arranged to lock the movement of the first body with respect to the second body in a plurality of positions, the locking member comprising first and second segments, said first segment being designed to pass through said orifice and be inserted between two successive grooves of the screw thread on the internal body, said second segment being designed to pass through said orifice and be interposed in a space provided in an internal wall of the external body, and characterized in that said screw thread on the internal body has a trapezoidal thread with an vertex angle β, said first segment having the form of a truncated cone with a vertex angle β, said vertex angle β being substantially equal to the vertex angle β, said screw thread and said first segment being formed so that said first segment is inserted in said screw thread thus causing friction between them.

7. The stud according to claim 6, characterized in that said space comprises a surface whose thickness increases, said second segment being arranged to engage by rotation on this surface after the locking member has been introduced into the orifice.

8. The stud according to claim 6, characterized in that said orifice is oriented in the direction of the height and perpendicular to the screw thread.

9. The stud according to claim 6, characterized in that the locking member is housed in said base so that the locking member can be dislodged therein before use.

10. The stud according to claim 6, characterized in that said space has a non-threaded surface.

\* \* \* \* \*